(12) United States Patent
Hoteit et al.

(10) Patent No.: US 8,419,813 B2
(45) Date of Patent: Apr. 16, 2013

(54) INTEGRATED ENERGY AND/OR SYNTHESIS GAS PRODUCTION METHOD BY IN-SITU OXYGEN PRODUCTION, CHEMICAL LOOPING COMBUSTION AND GASIFICATION

(75) Inventors: Ali Hoteit, Lyons (FR); Florent Guillou, Lyons (FR); Arnold Lambert, Chavanay (FR); John Roesler, Vienne (FR)

(73) Assignee: IFP, Cedex (FR)

( * ) Notice: Subject to any disclaimer, the term of this patent is extended or adjusted under 35 U.S.C. 154(b) by 495 days.

(21) Appl. No.: 12/769,855

(22) Filed: Apr. 29, 2010

(65) Prior Publication Data
US 2010/0299997 A1 Dec. 2, 2010

(30) Foreign Application Priority Data

Apr. 29, 2009 (FR) .................... 09 02096

(51) Int. Cl.
*B01J 7/00* (2006.01)
*C01B 3/36* (2006.01)
*C01B 6/24* (2006.01)
*C10J 3/16* (2006.01)
*C10J 3/00* (2006.01)

(52) U.S. Cl.
USPC ............ 48/210; 48/197 R; 48/202; 48/61; 423/644

(58) Field of Classification Search .......... 48/61, 197 R, 48/202, 210
See application file for complete search history.

(56) References Cited

U.S. PATENT DOCUMENTS

| 6,682,714 B2 * | 1/2004 | Kindig et al. ............ 423/657 |
| 2001/0055559 A1 * | 12/2001 | Sanfilippo et al. ......... 423/648.1 |
| 2005/0175533 A1 * | 8/2005 | Thomas et al. ............ 423/657 |
| 2008/0164443 A1 * | 7/2008 | White et al. .............. 252/373 |
| 2009/0000194 A1 * | 1/2009 | Fan et al. ................ 48/199 R |
| 2009/0020405 A1 * | 1/2009 | Fan et al. ................ 201/12 |
| 2009/0222136 A1 * | 9/2009 | Lou ...................... 700/272 |

FOREIGN PATENT DOCUMENTS

| WO | WO 2007/082089 A2 | 7/2007 |
| WO | WO 2008/036902 A2 | 3/2008 |

OTHER PUBLICATIONS

Liangshih Fan et al.; Utilization of chemical looping strategy in coal gasification processes; Particuology, 2008, pp. 131-142, vol. 6, No. 3, Published by Elsevier B.V.
Henrik Leion et al.; The use of petroleum coke as fuel in chemical-looping combustion, Fuel, IPC Science and Technology Press, Guildford, GB, May 23, 2007, pp. 1947-1958, vol. 86, No. 12-13.
Tobias Mattisson et al.; Chemical-looping combustion using syngas as fuel, International Journal of Greenhouse Gas Control I, 2007, pp. 158-169, vol. 1, No. 2, Published by Elsevier Ltd.
Edward J. Anthony et al.; Solid Looping Cycles: A New Technology for Coal Conversion, Ind. Eng. Chem. Res., 2008, pp. 1747-1754, vol. 47, No. 6.

* cited by examiner

*Primary Examiner* — Matthew Merkling
(74) *Attorney, Agent, or Firm* — Antonelli, Terry, Stout & Kraus, LLP.

(57) ABSTRACT

The invention relates to an integrated method of in-situ oxygen production, chemical looping combustion and gasification of liquid, solid or gaseous fuels allowing combustion of coal, petroleum coke and/or liquid hydrocarbons and notably heavy and/or extra heavy or bituminous residues for production of synthesis gas under pressure and/or energy.

15 Claims, 4 Drawing Sheets

INTEGRATED ENERGY AND/OR SYNTHESIS GAS PRODUCTION METHOD BY IN-SITU OXYGEN PRODUCTION, CHEMICAL LOOPING COMBUSTION AND GASIFICATION

FIELD OF THE INVENTION

Context: Chemical Looping $CO_2$ Capture

Considering the climate changes observed during the past decades and those predictable in the long term, controlling greenhouse gas emissions is becoming an increasingly strong requirement for all economic sectors, in particular those concerning energy production. One of the various possible ways of controlling greenhouse gas discharge to the atmosphere is carbon capture and sequestration. This option is specially suited in case of a centralized use of fossil energies. The most part of the solutions considered induce a high energy penalty, with an autoconsumption of the order of 20% to 30%.

BACKGROUND OF THE INVENTION

Among the combustion means allowing $CO_2$ capture, oxy-combustion units afford the advantage of producing combustion fumes free of nitrogen from the combustion air since combustion is achieved from pure oxygen. Such a method is for example described in patent WO-2007/039,687 A. This oxygen is produced by an air separation unit (ASU). One drawback of this combustion mode and of ASUs in particular is their high energy consumption and their high investment cost that significantly increases the overall capture cost.

One solution thus consists in using a chemical looping combustion method. Chemical looping combustion involves a high potential in terms of energy efficiency and cost reduction. This method avoids the energy penalty linked with the separation of oxygen and air. It is based on the oxygen transfer capacity of some materials such as metallic oxides. An air reactor is used to oxidize the oxygen carriers prepared in form of fine particles that are transferred to a fuel reactor where they are reduced by combustion of the fuel. This method is generally carried out on a pilot scale in form of two fluidized beds exchanging solid streams: the air reactor being then a fast fluidization type reactor at the top of which the oxygen-depleted air stream and the particles are separated by a cyclone, the particles moving down through gravity in the fuel reactor consisting of a dense fluidized bed, where an overflow achieves reinjection of the solids at the bottom of the riser, while the combustion gases (essentially $CO_2$ and $H_2O$) are discharged through the overhead of this dense fluidized bed. Patent FR-2,850,156 notably describes the principle of chemical looping combustion, in a method dedicated to coal combustion.

In the case of solid fuels, unburnt residues remain at the reduction reactor outlet. They are carried along with the oxygen carrier into the air reactor where they are burned, which however produces $CO_2$ mixed nitrogen, which affects the capture rate of the unit. To avoid this, it is necessary to have a specific equipment for separation between particles of different nature but of comparable size, hence the complexity of the system, in particular in the case of large-scale industrial extrapolation.

Tests have been carried out for chemical looping integration in hydrocarbon conversion plants.

For example, document WO-2007/082,089 A2 describes a three-stage method highlighting the use of metallic oxides recirculation for hydrogen production. In a first reactor, total combustion of the fuel allows to produce $CO_2$, $H_2O$. Hydrogen production is performed by reoxidizing the metallic oxide by means of steam. This method requires high steam flow rates, and it is therefore necessary to heat and to evaporate a large amount of water prior to feeding it into the oxidation reactor, which leads to a limiting energy balance.

Hydrogen production can also be achieved through gasification: patent application WO-2008/036,902 A2 describes for example a hydrocarbon gasification method that is implemented in a conventional layout with two reaction zones.

However, a problem that faces the person skilled in the art wanting to produce synthesis gas (therefore hydrogen) by gasification is the kinetics of the reactions that take place in the gasification reactor, as well as the high reaction temperatures in the gasification reactor. The residence time required for the reactants is thus long. This directly affects the size of the plants and, more specifically, the size of the reactors involved, which leads to high investment costs.

Some oxygen carriers have the capacity to spontaneously release part of their oxygen in an oxygen-poor medium. Thus, we have discovered that the presence of an oxygen production reactor within a chemical loop allows to gasify the fuel with an oxygen-enriched mixture while avoiding direct solid-solid fuel contact. It is thus possible to do without solid-solid separation equipments. This particular configuration furthermore affords the advantage of improving the energy balance of the gasification stage, very endothermic in the absence of oxygen, and of accelerating the reactions since the reactions that occur are reactions between a solid and a gas (and no longer between a solid and a solid). The method according to the invention is particularly advantageous for gasification of heavy feeds.

SUMMARY OF THE INVENTION

The invention relates to a method of producing energy and/or synthesis gas through gasification of at least one liquid and/or solid feed in at least one chemical loop comprising at least four distinct oxidation, reduction, gasification and oxygen production reaction zones, wherein:

a) oxygen is produced in an oxygen production reaction zone R2 by exposing a metallic oxide in its state of maximum oxidation to a gaseous atmosphere with a low oxygen partial pressure consisting of a carrier gas comprising the reduction effluents;

b) the oxygen produced in stage a) is transported by means of the carrier gas optionally under pressure to a gasification reaction zone R4 and gasification of the liquid and/or solid feed is carried out by contacting said oxygen-enriched carrier gas at high temperature with said feed so as to produce the synthesis gas $CO+H_2$;

c) reduction of the oxygen carrier solid is carried out so as to release oxygen allowing to oxidize the synthesis gas, in a reduction reaction zone R3, the reduction reaction in said reduction reaction zone being exothermic;

d) the oxygen carrier solid that has been at least partly reduced to provide the system with oxygen is oxidized on contact with air so as to recover its maximum oxidation state, in an oxidation reaction zone R1, and wherein the heat provided by the reactions involved in said oxidation reaction zone R1 and in said reduction reaction zone R3 is used to allow energetic operation of the method.

In an embodiment, the synthesis gas is produced under pressure in stage b) and expansion of the gas produced is carried out prior to reduction of the oxygen carrier solid in stage c).

At least part of the synthesis gas produced can be used in the method to provide the heat required for operation and possibly to produce excess heat that can be upgraded.

Preferably, at least part of the synthesis gas or even all of the synthesis gas is sent to the reduction reaction zone.

At least part of the synthesis gas produced can be upgraded at the outlet of the gasification reaction zone.

The liquid and/or solid feed can be selected from among coal, petroleum coke or liquid feeds less than 10% of which has a boiling point temperature below 340° C.

In an embodiment, the reduction, oxidation and oxygen production reaction zones are distinct reaction zones located in a single reactor. The reactor can then be a rotary reactor.

In another embodiment, the reduction, oxidation and oxygen production reaction zones are located in distinct reactors.

Exportable excess energy can be recovered by heat exchange inside the reaction zones or on the gaseous effluents.

Advantageously:

the metallic oxide remaining transfer capacity fraction X ranges between 0.8 and 1 at the outlet of oxidation reaction zone R1;

the remaining transfer capacity fraction X ranges between 0 and 0.3 at the outlet of reduction reaction zone R3;

the total transfer capacity fraction ΔX ranges between 0.01 and 1 in oxygen production zone R2.

More Preferably:

the metallic oxide remaining transfer capacity fraction X ranges between 0.95 and 1 at the outlet of oxidation reaction zone R1;

the remaining transfer capacity fraction X ranges between 0 and 0.1 at the outlet of reduction reaction zone R3;

the total transfer capacity fraction ΔX ranges between 0.05 and 0.5 in oxygen production zone R2.

The invention relates to the use of the method described above for heat production.

The invention also relates to the use of the method described above for the production of synthesis gas under pressure.

BRIEF DESCRIPTION OF THE FIGURES

FIG. 1 illustrates the streams of the metallic oxides and of the solid, liquid and/or gaseous feeds in the base configuration of the method according to the invention.

DETAILED DESCRIPTION

Definitions

Figure 1:
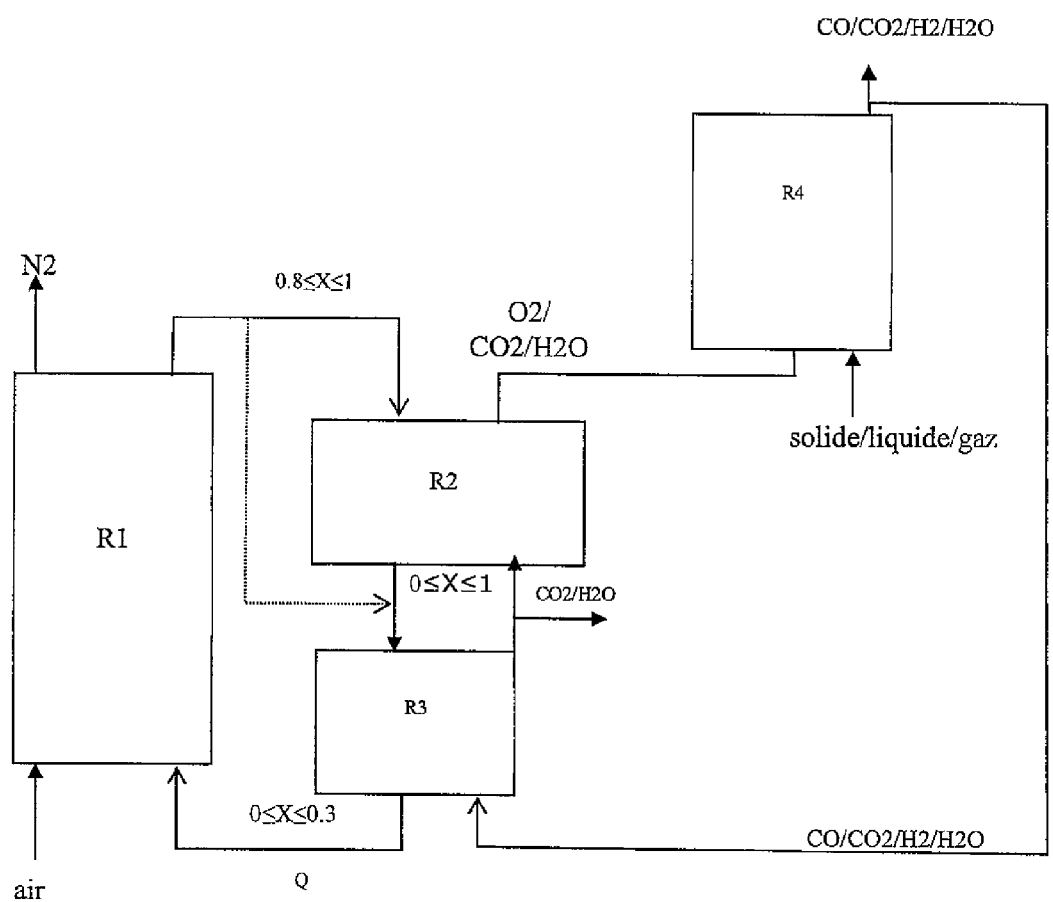
FIG. 1 is a flow sheet of the invention.

In the description hereafter, what is referred to as "oxygen carrier solid" is any metallic oxide for which the degree of oxidation of the metal can vary depending on its oxygen content. This variation can be exploited for transporting the oxygen between two reactive media. In an oxidizing medium rich in oxygen $O_2$, the degree of oxidation of the metal is maximized, i.e. the oxygen content of the solid is maximized. In a medium poor in oxygen $O_2$, the previously oxidized solid will spontaneously release part of its oxygen and its oxidation state will decrease in comparison with its degree of oxidation when it was completely oxidized.

An "oxygen carrier solid" is also defined by its reversible oxygen transfer capacity, i.e. the amount of oxygen that this carrier can exchange with the reaction medium between its most oxidized state and its least oxidized state, in a reversible manner.

X is defined as the remaining oxygen transfer capacity fraction in the oxide.

Finally, ΔX is defined as the total oxygen transfer capacity fraction.

Operation of the method according to the invention takes place in four reactive zones or reaction zones that can be made up of common or separate reactors and that are distinguished by the reactions that occur therein. For simplification reasons, in the following examples, each reactive zone or reaction zone is associated with a reactor. They are defined as follows:

oxygen production reactor (reaction zone R2): the oxygen carrier solid (metallic oxide in its maximum oxidation state) is exposed to an oxygen pressure that is kept low through sweep of a carrier gas or by means of a depression. This results in removing part of the oxygen contained in the solid;

gasification reactor (reaction zone R4): the oxygen extracted from the solid is compressed and brought, by means of the carrier gas, into contact with the liquid or solid feed at high temperature in order to gasify it. It is here that the synthesis gas (advantageously) under pressure is produced. Part of the gas produced can be sent out of the process optionally for upgrading, the remaining part (which may be all of it) is used within the process, on the one hand to provide the heat required for operation and, on the other hand, possibly to produce heat that can be upgraded;

reduction reactor (also referred to as "fuel reactor", reaction zone R3): the synthesis gas produced is first expanded (possible source of energy), then contacted with the oxygen carrier solid. By changing to a more reduced form, the oxygen carrier releases oxygen that is used to oxidize the synthesis gas. This reaction is globally exothermic and it constitutes one source of heat for the process;

oxidation reactor (also referred to as "air reactor", reaction zone R1): the oxygen carrier solid, which has been at least partly reduced to provide the system with oxygen, is reoxidized on contact with air in this reactor to its most oxidized form. This stage is exothermic and it constitutes the other source of heat of the process.

General Description of the Method According to the Invention

The base concept (FIG. 1) of the method according to the invention is based on a configuration that comprises:

1. an "air" reactor (reaction zone R1) wherein the reaction of oxidation of the metallic oxides takes place after reduction;

2. an "oxygen production" reactor (reaction zone R2) where the oxygen carrier solid spontaneously releases part of its oxygen in a carrier gas consisting of oxygen-poor reduction effluents. The oxygen produced is thus transported by the carrier gas to the gasification reactor;

3. a "gasification" reactor (reaction zone R4) for the solid and/or liquid feeds in order to produce a synthesis gas by means of an oxidizing gas enriched in oxygen from R2;

4. a "reduction" reactor (reaction zone R3) wherein the reaction of combustion of the gasified feed takes place in the presence of the oxygen present in the metallic oxides;

5. particle-gas separation devices (cyclone);

6. sealing and linking devices between the reactors (siphon).

In the method according to the invention, the metallic oxide transfer capacity fraction generally depends on the reaction zone. Advantageously:

the remaining transfer capacity fraction X ranges between 0.8 and 1, preferably between 0.95 and 1, which corresponds to the most oxidized state, at the outlet of reaction zone R1;

the total oxygen transfer capacity fraction ΔX ranges between 0.01 and 1, preferably between 0.05 and 0.5, which corresponds to the amount of oxygen spontaneously released by the material, in oxygen production zone R2;

the remaining transfer capacity fraction X ranges between 0 and 0.3, preferably between 0 and 0.1, which corresponds to the most reduced state, at the outlet of reaction zone R3.

Solid Circulation Sequence Between the Reactors

In the description of the figures hereafter, the term "reactor" designates, for simplification reasons, a reaction zone comprising one or more reactors wherein reactions of same nature take place.

FIG. 1

A stream of metallic oxides circulates from the air reactor (oxidation reactor R1) in its most oxidized state ($0.8 \leq X \leq 1$ and preferably $0.95 \leq X \leq 1$) to the oxygen production reactor (R2) where the material spontaneously releases its oxygen ($0.01 \leq \Delta X \leq 1$, preferably $0.05 \leq \Delta X \leq 50.5$) in a carrier gas stream consisting (at least partly) of oxygen-poor reduction effluents (R3) ($CO_2 + H_2O$). This gaseous effluent is transported to gasification reactor R4 where it is contacted with a fuel to produce a synthesis gas. All or part thereof is sent to the reduction reactor (R3) and the rest can be upgraded in applications such as Fischer-Tropsch or fuel cells. In reduction reactor (R3), the synthesis gas reacts on contact with the oxygen carrier. This reaction is exothermic and it produces a gas practically exclusively consisting of carbon dioxide and of steam. At the end of this reaction, the oxygen carrier solid is in its most reduced form ($0 \leq X \leq 0.3$, preferably $0 \leq X \leq 0.1$) and it is sent to oxidation reaction (R1). It is reoxidized therein to its maximum oxidation state ($0.8 \leq X \leq 1$, preferably $0.95 \leq X \leq 1$) during an exothermic reaction with the oxygen of the air. The process is also complemented by units for treating sulfur in $H_2S$ and/or $SO_2$ form if the fuel contains sulfur.

FIG. 2

Figure 2:
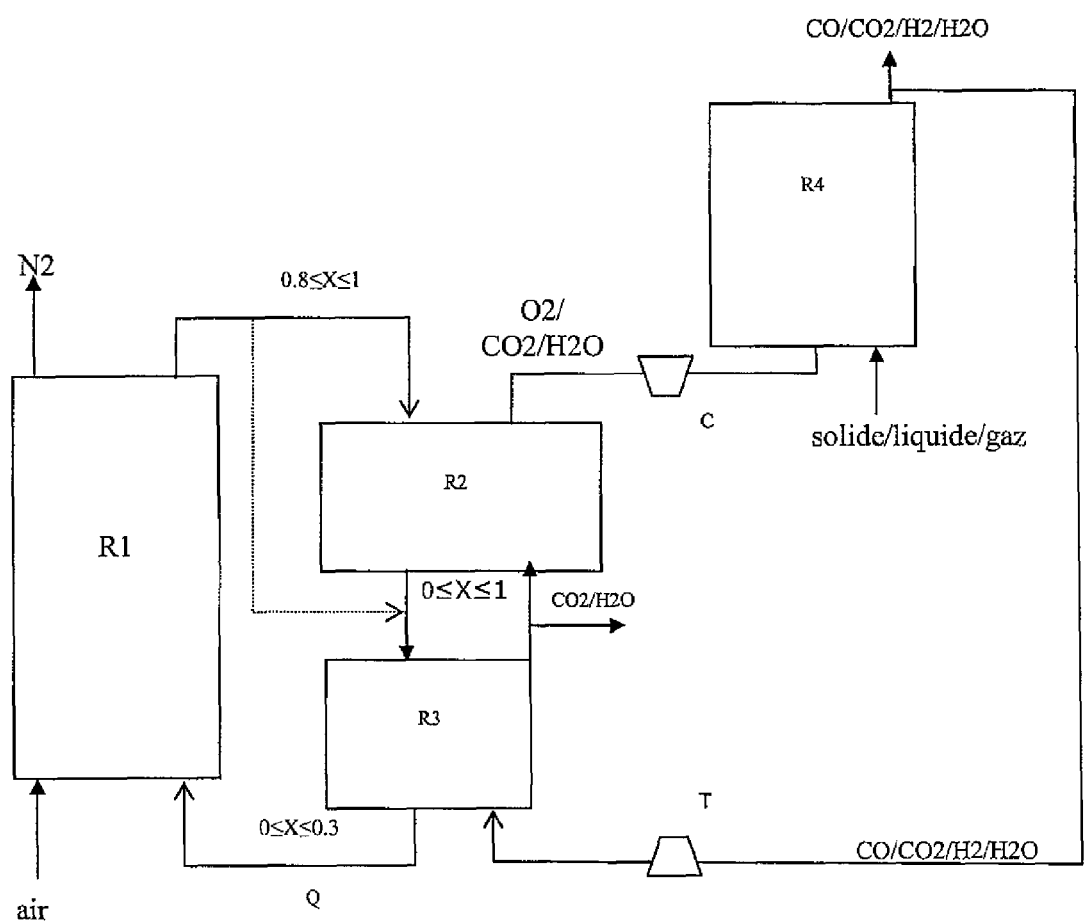
FIG. 2 illustrates an embodiment of the invention concerning the production of synthesis gas under pressure.

One advantage of the method according to the invention is that it allows to produce synthesis gas under pressure, in an embodiment illustrated by FIG. 2. A compressor (C)-turbine (T) assembly is therefore added to the device allowing the method according to the invention to be implemented. The stream of oxygen-rich carrier gas ($CO_2H_2O+O_2$) is thus compressed prior to being fed into gasification reactor R4, up to pressures of the order of 40 bars. Gasification is then carried out at high pressure (40 bars) and high temperature (up to more than 1000° C.). The synthesis gas ($CO+H_2$) resulting from the gasification reaction is then also under pressure. The synthesis gas sent back to the reduction reactor is expanded in a turbine to recover the energy.

Figure 3A:
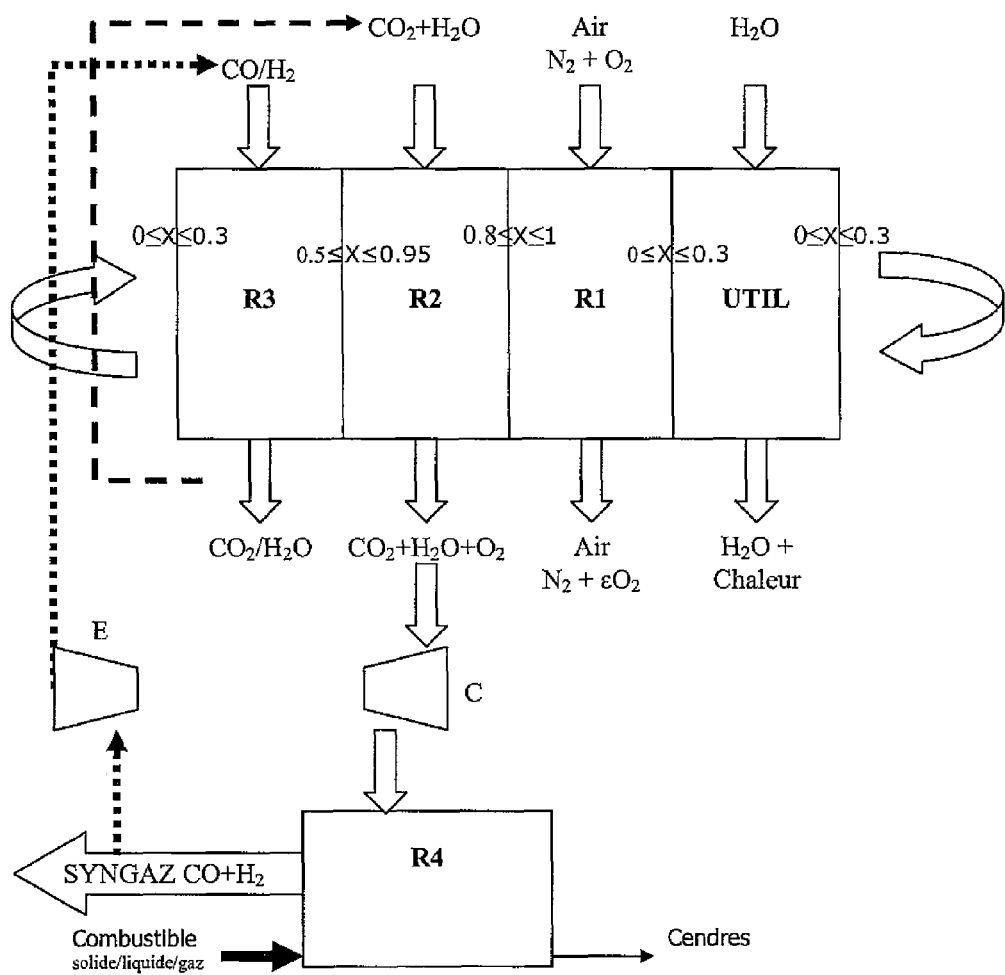
FIGS. 3A and 3B illustrate an embodiment of the invention wherein the method is implemented in a rotary reactor.
Figure 3B:
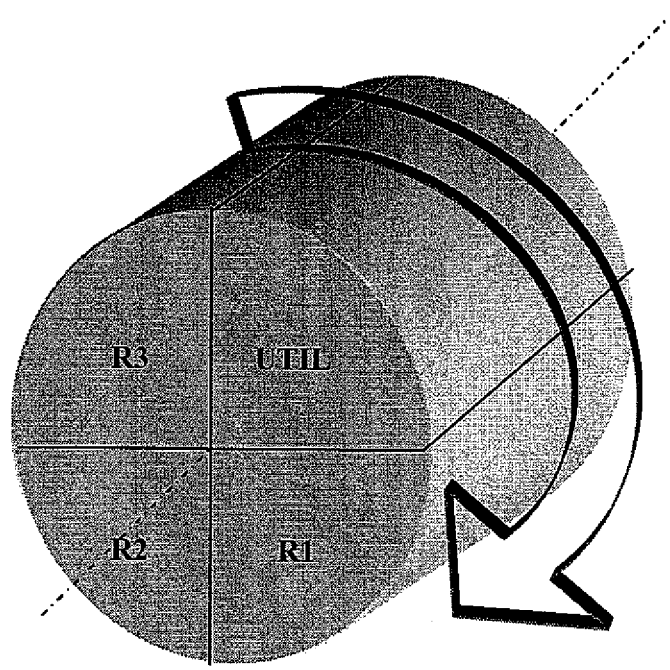

FIGS. 3A and 3B

FIG. 3A

The principles presented through FIGS. 1 and 2 can be taken up in a configuration comprising a rotary reactor, an embodiment illustrated by FIGS. 3A and 3B, where the oxygen production, reduction and oxidation reactions take place within a single rotating solid structure. The rotation thus represents the transport of the oxygen carrier solid between reactors R1, R2 and R3 described above.

In this particular embodiment, transport of the solid between the various reaction zones is achieved by means of a rotating reactor, a device most often made up of a cylindrical porous matrix allowing passage of the gases along its axis of rotation. The active phase, i.e. the oxygen carrier, is immobilized on this matrix. Rotation of the cylindrical reactor takes place opposite the reactant inlets and the vents. The cylinder portion contained between a reactant inlet/vent pair makes up a reaction zone.

By analogy with the devices described above, four reaction zones are defined:

R1: reaction zone supplied with "$N_2+O_2$" air, the cylinder rotation is such that the cylinder section entering the reaction zone carries the partly reduced oxygen carrier solid ($0 \leq X \leq 0.3$) and that the cylinder section leaving the reaction zone carries the oxygen carrier solid in its most oxidized state ($0.85 \leq X \leq 1$, preferably $0.95 \leq X \leq 1$). The gases leave reaction zone R1 through a vent leading the air depleted in oxygen "$N_2$" outside the unit. Reaction zone R1 corresponds to the air reactor defined above.

R2: reaction zone supplied with $CO_2$ and $H_2O$ that follows zone R1 in the cylinder rotation sequence. The cylinder portion entering this zone thus carries the oxygen carrier in its most oxidized state ($0.8 \leq X \leq 1$, preferably $0.95 \leq X \leq 1$). This reaction zone corresponds to the oxygen production reactor defined above, the gases leaving this zone through the vent consist of $CO_2$, $H_2O$, as well as $O_2$ intended for gasification of the feed. This effluent is compressed. The cylinder portion leaving the reaction zone carries the partly reduced solid ($0.01 \leq \Delta X \leq 0.99$, preferably $0.05 \leq \Delta X \leq 0.5$).

R4: this zone is not involved in the reaction cycle of the rotating reactor. It is a hydrocarbon gasification reactor, exterior to the rotating reactor, supplied with oxidising gas under pressure by the effluents of reaction zone R3 and supplied with solid or liquid hydrocarbon feed. The gaseous effluent predominantly and preferably consists of synthesis gas $H_2+CO$ under pressure. Depending on the operating mode selected, all or part of the synthesis gas is sent to combustion zone R3 according to whether heat production or synthesis gas production is to be favoured respectively. The synthesis gas being under pressure, it is expanded in a turbine prior to being sent to reaction zone R3.

R3: reaction zone supplied with synthesis gas $H_2+CO$ expanded by the external gasifier (reaction zone R4). Reaction zone R3 follows reaction zone R2 in the cylinder rotation sequence. This reaction zone corresponds to the "fuel reactor" defined above. The cylinder portion entering zone R3 carries the solid in an oxidized state at a degree of oxidation corresponding to the outlet of the "oxygen production reactor" zone ($0.01 \leq X \leq 1$ and preferably $0.50 \leq X \leq 0.95$). The carrier is reduced on contact with the synthesis gas. The gaseous effluent leaving reaction zone R3 is practically exclusively made up of $CO_2$ and $H_2O$. The oxygen carrier solid leaving reaction zone R3 is in the most reduced state of the entire reaction cycle ($0 \leq X \leq 0.3$ and preferably $0 \leq X \leq 0.1$).

UTIL: this reaction zone corresponds to the use of the heat. The reactions that take place on the cylinder are globally exothermic. In zone UTIL, steam is overheated on contact with the solid so as to balance the thermal balance of the cycle. This allows the user to be provided with heat. During this stage, partial reoxidation is possible ($0 \leq X \leq 0.9$ and preferably $0 \leq X \leq 0.1$).

FIG. 3B

This figure shows a proposal of spatial distribution of the reactive zones for the rotating reactor system described above. Each zone thus occupies a cylinder portion contiguous to the next one around the axis of rotation of the cylinder.

Nature of the Metallic Oxides

The metallic oxides that can be used in the method according to the invention can be selected from among the oxides of the transition elements of columns IIIB to IIB (for example Fe, Ti, Ni, Cu, Mo, Mn, Co, V) of the periodic table, alone or in admixture, associated or not with a ceramic type binder conferring improved mechanical strength to them (the binders likely to be used are, for example, alumina, aluminates of spinel type, silica, titanium dioxide, kaolin, cerine zirconia, bentonite or used catalysts), and possibly a higher oxygen transfer capacity (notably for cerine zirconia type binders). It is also possible to use oxides of perovskite, spinel, olivine, hematite, ilmenite, pyrochiorine type. These are simple or mixed oxide families whose structure is well determined.

The metallic oxides can come in form of natural ores (such as ilmenite, hematite for example) or in an optimized synthetic form so as to obtain a higher oxygen transfer capacity.

Preferably, these solids are conditioned in powder form, with a Sauter diameter preferably ranging between 30 and 500 microns, and a grain density ranging between 1400 and 8000 kg/m$^3$, preferably between 1400 and 5000 kg/m$^3$.

Operating Conditions

One ensures one has a suitable design for the reactions in the "air" (R1), oxygen production (R2), fuel (R3) and gasification (R4) reactors to take place at a temperature ranging between 700° C. and 1200° C.

The residence time of the metallic oxide in air reactor (R1) depends on the oxidation and/or reduction state of these oxides and it can be estimated between 1 and 20 minutes.

The residence time of the metallic oxide in oxygen production reactor (R2) depends on the nature of the oxygen carrier solid and it can be estimated between 1 and 360 seconds.

The residence time of the metallic oxide in fuel reactor (R3) depends on the nature of the fuel and it can be estimated between 1 and 15 minutes.

The residence time of the metallic oxide in gasification reactor (R4) depends on the nature of the fuel to be gasified and it can be estimated between 1 and 20 minutes.

In the case of the rotating reactor, the residence time of the oxide in the heat recovery part UTIL depends on the amount of heat to be discharged and on the nature of the stream used to recover the heat produced. The residence time in part UTIL can be estimated between 1 and 600 seconds.

Specific Advantages of the Invention

The advantages of the invention listed below are described by way of non imitative example.

1. The invention allows coupling between the chemical looping combustion process, the gasification process and oxygen production.

2. The invention allows to directly inject coal, petroleum coke or heavy feeds into the gasification reactor in contact with the oxygen supplied by the oxygen carrier in the oxygen production reactor. Heavy feeds are feeds less than 10 mass % of which has a boiling point temperature below 340° C.

3. The invention allows to produce synthesis gas under pressure in the gasification reactor by compression of the oxygen-rich carrier gas so as to save the higher amount of energy that would be required to gasify the hot synthesis gas (CO+H$_2$) at the unit outlet.

4. The invention allows to deplete the carrier gas in water by condensation so as to improve the compressibility thereof.

5. The invention allows to recover the heat of the oxygen carrier gas prior to compression and the expansion energy of the synthesis gas to feed the oxygen carrier gas compressor.

6. The invention allows to use all of the synthesis gas, if necessary, to produce heat within the process in the reduction reactor.

7. The invention allows to produce synthesis gas by means of the present method by upgrading a maximum amount of synthesis gas at the gasification reactor outlet and by recycling the minimum amount required for smooth running of the process.

8. The invention allows to supply the energy required for the production of synthesis gas under pressure and for the production of energy and/or electricity in the case of the chemical combustion looping coupled with an oxygen production reactor, 9. In the method according to the invention, the feed, preferably a heavy feed, is gasified with an oxygen-enriched mixture, which makes the gasification process exothermic (reaction zone R4). Furthermore, the synthesis gas combustion in the fuel reactor is exothermic and leads to an increase in the energy efficiency of the process while avoiding endothermic stages that would require an external energy supply.

The examples below show the advantage, in relation to other technologies, of the method according to the present invention, which allows to produce synthesis gas and/or heat by means of a device including a chemical loop with an oxygen carrier solid and a liquid or solid feed gasifier without any contact between the oxygen carrier solid and the liquid or solid feed, thus allowing to do without specific solid-solid separation devices.

EXAMPLES

In the examples, two possible embodiments of the invention are illustrated: in the first one, one wants to maximize the production of synthesis gas, in the second one tries to upgrade the feed in form of heat production. In each case, the material and energy balances are given. A general case is first presented to explain the data used in these examples.

Example 1

Operation of the Integrated Method According to the Invention

The operating conditions considered in each stage are as follows:

Gasification 1) the gasification reaction is carried out autothermally at a temperature that depends on the exothermicity of the reaction, therefore on the amount of oxygen introduced;
2) the fluidization parameters are not taken into account;
3) the reactants are the solid or liquid feed;
4) the reaction is endothermic in the absence of oxygen.

Reduction 1) the reduction reaction is complete. The reaction products are CO$_2$ and H$_2$O;
2) the exchange is ideal between the oxygen carrier and the gaseous fuel: there is no diffusion limitation, no carbon formation, no reactivity loss;
3) the reaction is exothermic.

Oxidation 1) the oxidation reaction is complete;
2) the exchange is ideal between the oxygen carrier and the air;
3) the reaction is exothermic.

Oxygen Production 1) the progress of the reaction is limited to 2% maximum;
2) the reaction is endothermic.

The oxygen carrier solid selected is a mixed iron-manganese oxide for which one considers that up to 2 wt. % of the oxygen it contains can be extracted in its most oxidized form. The reversible oxidation reaction considered is as follows, for T>1000 K:

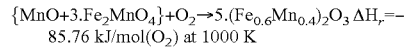

$\{MnO+3.Fe_2MnO_4\}+O_2 \rightarrow 5.(Fe_{0.6}Mn_{0.4})_2O_3 \ \Delta H_r=-85.76 \ kJ/mol(O_2) \ at \ 1000 \ K$ The characteristics of the oxidized and reduced forms are as follows:
oxidized form: $(Fe_{0.6}Mn_{0.4})_2O_3$
Cp=1.018 kJ/kg/K (value calculated using the group contribution method—[1] Mostafa et al., Ind. Eng. Chem. Res., Vol. 35, No. 1, 1996)
M=158.96 g/mol
The characteristics of the oxidized and reduced forms are as follows: oxidized form: $\{MnO+3.Fe_2MnO_4\}$
Cp=0.905 kJ/kg/K (value calculated using the group contribution method[-1] Mostafa et al., Ind. Eng. Chem. Res., Vol. 35, No. 1, 1996)
M=762.81 g/mol
For the reduction reactions, it corresponds to the combustion of the various compounds of the synthesis gas on the solid:
Dihydrogen:

$$H_2+5/2(Fe_{0.6}Mn_{0.4})_2O_3 \rightarrow \tfrac{1}{2}\{MnO+3.Fe_2MnO_4\}+H_2O \; \Delta H_r=-206.48 \text{ kJ/mol}(H_2) \text{ at } 1000 \text{ K}$$

Carbon Monoxide:

$$CO+5/2(Fe_{0.6}Mn_{0.4})_2O_3 \rightarrow \tfrac{1}{2}\{MnO+3.Fe_2MnO_4\}+CO_2 \; \Delta H_r=-238.55 \text{ kJ/mol}(CO) \text{ at } 1000 \text{ K}$$

Methane:

$$CH_4+10.(Fe_{0.6}Mn_{0.4})_2O_3 \rightarrow \tfrac{1}{2}\{MnO+3.Fe_2MnO_4\}+2.H_2O+CO_2 \; \Delta H_r=-630.38 \text{ kJ/mol}(CH_4) \text{ at } 1000 \text{ K}$$

The feed gasification reaction is modelled by a Gibbs energy minimization whose enthalpy is calculated as a function of the formation energies of the various species present.

The feed selected in this example is a $C_{18}H_{30}$ model liquid feed that represents the use of a medium fuel oil.

The feed flow rate selected determines the amount of solid to be circulated in the loop as a function of the oxygen requirements for the gasification and combustion operations.

Example 2

Synthesis Gas Production

The present invention allows to adjust the production between maximization of the thermal energy produced by the method and maximization of the amount of synthesis gas (syngas) at the process output in relation to the amount of hydrocarbon feed introduced.

In the present example, one wants to maximize the amount of synthesis gas produced.

Oxygen Production Reactor:

The oxygen carrier solid is swept with a gas to maintain the oxygen partial pressure low. This gas also serves as a carrier gas for transporting the oxygen to the gasifier. The hot gases resulting from the combustion of the synthesis gas on the solid, three quarters of which are recycled, are used here. This gas consists of water and carbon dioxide, it flows in at a temperature of 902° C. and at a flow rate of 11.4 kmol/h. The oxygen production reaction is endothermic and it consumes 444 kW in form of heat.

Solid Phase:

| Oxide | reactor inlet, T° = 900° C. | reactor outlet, T° = 897° C. |
|---|---|---|
| $(Fe_{0.6}Mn_{0.4})_2O_3$ | 3816 kmol/h | 3777 kmol/h |
| $\{MnO + 3 \cdot Fe_2MnO_4\}$ | 0 kmol/h | 7.63 kmol/h |

The outlet temperature of the gases is also 897° C.

Gasification Reactor:

In this reactor, many reactions occur, we consider the following reactions:

$$C + H_2O \longleftrightarrow CO + H_2, \; \Delta Hr_{298K} = 131 kJ \cdot mol^{-1}$$

$$C + CO_2 \longleftrightarrow 2CO, \; \Delta Hr_{298K} = 173 kJ \cdot mol^{-1}$$

$$C + \tfrac{1}{2}O_2 \longleftrightarrow CO, \; \Delta Hr_{298K} = -111 kJ \cdot mol^{-1}$$

$$C + O_2 \longleftrightarrow CO_2, \; \Delta Hr_{298K} = -395 kJ \cdot mol^{-1}$$

$$n \cdot C + \tfrac{m}{2} \cdot H_2 \longleftrightarrow C_nH_m, \; \Delta Hr_{298K} < 0$$

$$n \cdot CO + \tfrac{n+m}{2} \cdot H_2 \longleftrightarrow C_nH_m + n \cdot H_2O, \; \Delta Hr_{298K} < 0$$

$$CO + H_2O \longleftrightarrow CO_2 + H_2, \; \Delta Hr_{298K} = -41 kJ \cdot mol^{-1}$$

$$C + 2 \cdot H_2 \longleftrightarrow CH_2, \; \Delta Hr_{298K} = -74.87 kJ \cdot mol^{-1}$$

$$4 \cdot C_nH_m \longleftrightarrow m \cdot CH_4 + (4n-m) \cdot C, \; \Delta Hr_{298K} < 0$$

In our case, we assume equilibrium and the composition of the synthesis gas is determined by Gibbs energy minimization.

In the method according to the present invention, the oxygen carrier gas is compressed prior to gasification so as to gasify under pressure and to obtain a synthesis gas under pressure. The energy expenditure for compressing the oxygen carrier gas is here estimated at 166 kWe. Compression of this gas requires cooling, which is done by water so as to produce steam in a shell-and-tube type exchanger.

Gasification Balance:

| Compound | Reactor inlet | Reactor outlet |
|---|---|---|
| CO2 | 6.21 kmol/h | 1.20 kmol/h |
| CO | 0 kmol/h | 28.79 kmol/h |
| O2 | 7.63 kmol/h | 0 kmol/h |
| H2 | 0 kmol/h | 19.63 kmol/h |
| H2O | 5.17 kmol/h | 1.67 kmol/h |
| CH4 | 0 kmol/h | 3.16 kmol/h |
| C18H30 | 1.49 kmol/h | 0 kmol/h |

Gasification is carried out at 40 bars, the reactants flow in at 905° C. and leave at 1058° C. due to the exothermicity of the gasification in the presence of oxygen.

The reaction thus produces a synthesis gas 75% of which are extracted from the process to be upgraded, i.e. 980 kg/h synthesis gas at 40 bars and 1058° C.

The remaining part of the synthesis gas is intended both to produce the heat required for operation of the process and to serve, after combustion, as the carrier gas for transporting oxygen to the gasifier. This hot gas under pressure is expanded to generate energy that, complemented by the energy produced by the steam loop upstream from the compressor, is intended to supply the compressor with a view to process autonomy. The energy recovered from the turbine is estimated at 99 kWe, to which add 127 kWe from the steam loop.

Reduction Reactor:

In this reactor, the synthesis gas is oxidized on contact with the oxygen carrier solid according to the aforementioned reactions and reaction enthalpies.

| Compound | Reactor inlet 897° C. | Reactor outlet 902° C. |
|---|---|---|
| $CO_2$ | 0.30 kmol/h | 8.28 kmol/h |
| CO | 7.19 kmol/h | 0 kmol/h |
| $H_2$ | 4.91 kmol/h | 0 kmol/h |
| $H_2O$ | 0.42 kmol/h | 6.91 kmol/h |
| $CH_4$ | 0.79 kmol/h | 0 kmol/h |
| $(Fe_{0.6}Mn_{0.4})_2O_3$ | 3777 kmol/h | 3739 kmol/h |
| $\{MnO + 3 \cdot Fe_2MnO_4\}$ | 7.63 kmol/h | 15.26 kmol/h |

The energy recovered from this combustion is 0.87 MWth.

75% of the fumes are recycled, the rest is extracted from the unit. It is a stream made up only of water and carbon dioxide intended to be recovered, transported and stored. The energy potentially recoverable on this stream is estimated at 39 kWth.

The fluids and the solids leave the reduction reactor at a temperature of 902° C. as against a temperature of 897° C. at the inlet.

Heat Upgrading:

The heat produced by the process and transported by the solid can be upgraded at the reduction reactor outlet. For the thermal balance to be at equilibrium, no heat is upgraded at this level.

Oxidation Reactor:

At the reduction reactor outlet, the solid is in its most reduced state. In the oxidation reactor, it is reoxidized to its most oxidized form on contact with an air stream.

| Compound | Reactor inlet | Reactor outlet |
|---|---|---|
| $N_2$ | 58.0 kmol/h at 25° C. | 58.0 kmol/h at 900° C. |
| $O_2$ | 15.4 kmol/h at 25° C. | 0 kmol/h |
| $(Fe_{0.6}Mn_{0.4})_2O_3$ | 3740 kmol/h at 902° C. | 3816 kmol/h at 900° C. |
| $\{MnO + 3 \cdot Fe_2MnO_4\}$ | 15.3 kmol/h at 902° C. | 0 kmol/h |

The energy supplied in this reactor by the oxidation reaction and for bringing the compounds to 1100° C. is 935 kW. Part of this energy can be upgraded by recovering the heat on the depleted air stream, i.e. 0.17 MWth in the steam loop.

In the end, this process produces:

0.74 T/h synthesis gas at 40 bars and 1058° C. and 5.13 MWth for 0.37 T/h feed C18H30.

The synthesis gas has the following composition:

| Compound | Molar fraction |
|---|---|
| $CO_2$ | 0.02 |
| CO | 0.53 |
| $H_2$ | 0.36 |
| $H_2O$ | 0.03 |
| $CH_4$ | 0.06 |

The excess heat of the process, i.e. 331 kWth, is intended for heating of the feed that requires 277 kWth.

Example 3

Heat Production

The present invention allows to adjust the production between:

maximization of the thermal energy produced by the process, or maximization of the amount of synthesis gas (syngas) leaving the process in relation to the amount of hydrocarbon feed introduced.

In the present example, one wants to maximize the amount of heat produced by the process.

Oxygen Production Reactor:

The oxygen carrier solid is swept with a gas to maintain the oxygen partial pressure low. This gas also serves as a carrier gas for transporting the oxygen to the gasifier. The hot gases resulting from the combustion of the synthesis gas on the solid, three quarters of which are recycled, are used here. This gas consists of water and carbon dioxide, it flows in at a temperature of 934° C. and at a flow rate of 169 kmol/h. The oxygen production reaction is endothermic and it consumes 444 kW in form of heat.

Solid phase:

| Oxide | Reactor inlet, T° = 900° C. | Reactor outlet, T° = 897° C. |
|---|---|---|
| $(Fe_{0.6}Mn_{0.4})_2O_3$ | 3816 kmol/h | 3777 kmol/h |
| $\{MnO + 3 \cdot Fe_2MnO_4\}$ | 0 kmol/h | 7.63 kmol/h |

The outlet temperature of the gases is also 897° C.

Gasification Reactor:

In this reactor, many reactions occur, we consider the following reactions:

$$C + H_2O \longleftrightarrow CO + H_2, \Delta Hr_{298K} = 131 kJ \cdot mol^{-1}$$

$$C + CO_2 \longleftrightarrow 2CO, \Delta Hr_{298K} = 173 kJ \cdot mol^{-1}$$

$$C + \frac{1}{2}O_2 \longleftrightarrow CO, \Delta Hr_{298K} = -111 kJ \cdot mol^{-1}$$

$$C + O_2 \longleftrightarrow CO_2, \Delta Hr_{298K} = -395 kJ \cdot mol^{-1}$$

$$n \cdot C + \frac{m}{2} \cdot H_2 \longleftrightarrow C_n H_m, \Delta Hr_{298K} < 0$$

$$n \cdot CO + \frac{n+m}{2} \cdot H_2 \longleftrightarrow C_n H_m + n \cdot H_2O, \Delta Hr_{298K} < 0$$

$$CO + H_2O \longleftrightarrow CO_2 + H_2, \Delta Hr_{298K} = -41 kJ \cdot mol^{-1}$$

$$C + 2 \cdot H_2 \longleftrightarrow CH_2, \Delta Hr_{298K} = -74.87 kJ \cdot mol^{-1}$$

$$4 \cdot C_n H_m \longleftrightarrow m \cdot CH_4 + (4n - m) \cdot C, \Delta Hr_{298K} < 0$$

In our case, we assume equilibrium and the composition of the synthesis gas is determined by Gibbs energy minimization.

In the method according to the present invention, the oxygen carrier gas is compressed prior to gasification so as to gasify under pressure and to obtain a synthesis gas under pressure. The energy expenditure for compressing the oxygen carrier gas is here estimated at 1392 kWe. Compression of this gas requires cooling, which is done by water so as to produce steam in a shell-and-tube type exchanger, i.e. 1.69 MWth.

Gasification Balance:

| Compound | Reactor inlet | Reactor outlet |
|---|---|---|
| $CO_2$ | 90.4 kmol/h | 87.1 kmol/h |
| CO | 0 kmol/h | 43.9 kmol/h |
| $O_2$ | 7.63 kmol/h | 0 kmol/h |

-continued

| Compound | Reactor inlet | Reactor outlet |
|---|---|---|
| H2 | 0 kmol/h | 32.4 kmol/h |
| H2O | 76.0 kmol/h | 53.6 kmol/h |
| CH4 | 0 kmol/h | 19.8 kmol/h |
| C18H30 | 1.49 kmol/h | 0 kmol/h |

Gasification is carried out at 40 bars, the reactants flow in at 827° C. and leave at 745° C. due to the exothermicity of the gasification in the presence of oxygen.

The reaction thus produces a synthesis gas 0% of which is extracted from the process to be upgraded, i.e. 6.44 T/h synthesis gas at 40 bars and 745° C. intended both to produce the heat required for operation of the process and to serve, after combustion, as the carrier gas for transporting oxygen to the gasifier. This hot gas under pressure is expanded to generate energy intended to supply the compressor with a view to process autonomy. The energy recovered from the turbine is estimated at 1407 kWe.

Reduction Reactor:

In this reactor, the synthesis gas is oxidized on contact with the oxygen carrier solid according to the aforementioned reactions and reaction enthalpies.

| Compound | Reactor inlet 886° C. | Reactor outlet 934° C. |
|---|---|---|
| CO2 | 87.1 kmol/h | 151 kmol/h |
| CO | 43.9 kmol/h | 0 kmol/h |
| H2 | 32.4 kmol/h | 0 kmol/h |
| H2O | 53.6 kmol/h | 125 kmol/h |
| CH4 | 19.8 kmol/h | 0 kmol/h |
| $(Fe_{0.6}Mn_{0.4})_2O_3$ | 3777 kmol/h | 3390 kmol/h |
| $\{MnO + 3\cdot Fe_2MnO_4\}$ | 7.63 kmol/h | 85.2 kmol/h |

The energy recovered from this combustion is 8.21 MWth.

60% of the fumes are recycled, the rest is extracted from the unit. It is a stream made up only of water and carbon dioxide intended to be recovered, transported and stored. The energy potentially recoverable on this stream is estimated at 1.15 MWth.

The fluids and the solids leave the reduction reactor at a temperature of 934° C. as against a temperature of 886° C. at the inlet.

Heat Upgrading:

The heat produced by the process and transported by the solid can be upgraded at the reduction reactor outlet. Up to 3.6 MWth can be upgraded here. The solid is at a temperature of 911° C. after heat upgrading.

Oxidation Reactor:

At the reduction reactor outlet, the oxygen carrier solid is in its most reduced state. In the oxidation reactor, it is reoxidized to its most oxidized form on contact with an air stream.

| Compound | Reactor inlet | Reactor outlet |
|---|---|---|
| N2 | 324 kmol/h at 25° C. | 324 kmol/h at 900° C. |
| O2 | 86.2 kmol/h at 25° C. | 1.02 kmol/h |
| $(Fe_{0.6}Mn_{0.4})_2O_3$ | 3390 kmol/h at 911° C. | 3816 kmol/h at 900° C. |
| $\{MnO + 3\cdot Fe_2MnO_4\}$ | 85.2 kmol/h at 911° C. | 0 kmol/h |

The energy supplied in this reactor by the oxidation reaction and for bringing the compounds to 900° C. is 0.99 MWth.

Part of this energy can be upgraded by recovering the heat on the depleted air stream, i.e. 2.27 MWth.

In the end, this process produces:

8.09 MWth for 0.82 T/h feed C18H30. This heat comprises heating of the feed.

The invention claimed is:

1. A method of producing energy and/or synthesis gas through gasification of at least one liquid and/or solid feed in at least one chemical loop comprising at least four distinct oxidation, reduction, gasification and oxygen production reaction zones, wherein:
   a) oxygen is produced in an oxygen production reaction zone R2 by exposing an oxygen carrier solid comprising a metallic oxide, in its state of maximum oxidation, to a gaseous atmosphere with a low oxygen partial pressure comprising a carrier gas comprising reduction effluents;
   b) the oxygen produced in stage a) is transported by means of the carrier gas to a gasification reaction zone R4 and gasification of the liquid and/or solid feed is carried out by contacting said oxygen-enriched carrier gas at high temperature with said feed so as to produce synthesis gas $CO+H_2$;
   c) reduction of the oxygen carrier solid is carried out so as to release oxygen allowing to oxidize the synthesis gas, in a reduction reaction zone R3, the reduction reaction in said reduction reaction zone being exothermic;
   d) the oxygen carrier solid that has been at least partly reduced to provide the system with oxygen is oxidized on contact with air so as to recover its maximum oxidation state, in an oxidation reaction zone R1, and wherein the heat provided by the reactions involved in said oxidation reaction zone R1 and in said reduction reaction zone R3 is used to allow energetic operation of the method.

2. A method as claimed in claim 1, wherein the synthesis gas is produced under pressure in stage b) and expansion of the gas produced is carried out prior to reduction of the oxygen carrier solid in stage c).

3. A method as claimed in claim 1, wherein at least part of the synthesis gas produced is used in the method to provide the heat required for operation and possibly to produce excess heat that can be upgraded.

4. A method as claimed in claim 3, wherein at least part of the synthesis gas is sent to the reduction reaction zone.

5. A method as claimed in claim 4, wherein all of the synthesis gas is sent to the reduction reaction zone.

6. A method as claimed in claim 1, wherein at least part of the synthesis gas produced is upgraded at the outlet of the gasification reaction zone.

7. A method as claimed in claim 1, wherein the liquid and/or solid feed is selected from among coal, petroleum coke or liquid feeds less than 10% of which has a boiling point temperature below 340° C.

8. A method as claimed in claim 1, wherein the reduction, oxidation and oxygen production reaction zones are distinct reaction zones located in a single reactor.

9. A method as claimed in claim 8, wherein the reactor is a rotary reactor.

10. A method as claimed in claim 1, wherein the reduction, oxidation and oxygen production reaction zones are located in distinct reactors.

11. A method as claimed in claim 1, wherein the exportable excess energy is recovered by heat exchange inside the reaction zones or on the gaseous effluents.

12. A method as claimed in claim 1, wherein:
   the metallic oxide remaining transfer capacity fraction X ranges between 0.8 and 1 at the outlet of oxidation reaction zone R1;

the remaining transfer capacity fraction X ranges between 0 and 0.3 at the outlet of reduction reaction zone R3;

the total transfer capacity fraction ΔX ranges between 0.01 and 1 in oxygen production zone R2.

13. A method as claimed in claim 12, wherein:

the metallic oxide remaining transfer capacity fraction X ranges between 0.95 and 1 at the outlet of oxidation reaction zone R1;

the remaining transfer capacity fraction X ranges between 0 and 0.1 at the outlet of reduction reaction zone R3;

the total transfer capacity fraction ΔX ranges between 0.05 and 0.5 in oxygen production zone R2.

14. A method as claimed in claim 1, further comprising recovering exportable excess energy for the production of heat.

15. A method as claimed in claim 1, further comprising upgrading at least part of the synthesis gas at the outlet of the gasification reaction zone to produce synthesis gas under pressure.

\* \* \* \* \*